US012077138B2

(12) United States Patent
Muramatsu et al.

(10) Patent No.: US 12,077,138 B2
(45) Date of Patent: Sep. 3, 2024

(54) BRAKE CONTROL APPARATUS OF VEHICLE

(71) Applicant: ADVICS CO., LTD., Kariya (JP)

(72) Inventors: Sotaro Muramatsu, Kariya (JP); Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 124 days.

(21) Appl. No.: 17/439,672

(22) PCT Filed: Mar. 3, 2020

(86) PCT No.: PCT/JP2020/008883
§ 371 (c)(1),
(2) Date: Sep. 15, 2021

(87) PCT Pub. No.: WO2020/195603
PCT Pub. Date: Oct. 1, 2020

(65) Prior Publication Data
US 2022/0161769 A1    May 26, 2022

(30) Foreign Application Priority Data
Mar. 22, 2019   (JP) .................................. 2019-054493

(51) Int. Cl.
*B60T 7/22*      (2006.01)
*B60T 8/172*     (2006.01)
*B60T 8/1761*    (2006.01)

(52) U.S. Cl.
CPC ................ *B60T 7/22* (2013.01); *B60T 8/172* (2013.01); *B60T 8/17616* (2013.01);
(Continued)

(58) Field of Classification Search
CPC ........ B60T 7/22; B60T 8/172; B60T 8/17616; B60T 2201/022; B60T 2210/32; B60T 2250/04
See application file for complete search history.

(56) References Cited

U.S. PATENT DOCUMENTS

| 4,751,984 A * | 6/1988 | Williams ................ B66B 1/285 187/293 |
| 2010/0009807 A1* | 1/2010 | Umakoshi ............. B60T 13/662 477/73 |
| 2018/0345930 A1* | 12/2018 | Yasui ...................... B60T 8/172 |

FOREIGN PATENT DOCUMENTS

JP      2018203015 A      12/2018

OTHER PUBLICATIONS

International Search Report (PCT/ISA/210) with translation and Written Opinion (PCT/ISA/237) dated May 26, 2020, by the Japanese Patent Office as the International Searching Authority for International Application No. PCT/JP2020/008883.

* cited by examiner

*Primary Examiner* — Andrew J Cromer
(74) *Attorney, Agent, or Firm* — BUCHANAN INGERSOLL & ROONEY PC

(57) ABSTRACT

Braking torque is automatically applied based on requested deceleration and requested distance from a driving assistance device. Standard deceleration decreases in an "upwardly curved" form and then decreases in a "downwardly curved" form over time in a standard deceleration profile, and a standard speed profile corresponds to the standard deceleration profile. In the present calculation period, target deceleration and target speed profiles are set by adjusting the standard deceleration/standard speed profiles to satisfy the relationship between deceleration and vehicle body speed. The estimated distance from the reference speed to the vehicle stop is calculated based on the target speed profile. In a condition that the estimated distance is equal to/less than the requested distance is denied, braking torque is adjusted based on requested deceleration. After first satisfying the condition that the estimated distance (Continued)

is equal to/less than the requested distance, braking torque is adjusted according to the target deceleration profile.

1 Claim, 2 Drawing Sheets

(52) U.S. Cl.
CPC ..... *B60T 2201/022* (2013.01); *B60T 2210/32* (2013.01); *B60T 2250/04* (2013.01)

BRAKE CONTROL APPARATUS OF VEHICLE

TECHNICAL FIELD

The present disclosure relates to a brake control apparatus of a vehicle.

BACKGROUND ART

Patent Literature 1 describes, for the purpose of "providing a vehicle control apparatus capable of performing accurate and smooth automatic brake control," "a vehicle control apparatus including an automatic stop control unit that has a reference feedforward braking force deriving unit that derives a reference feedforward braking force for stopping at a stop position on the basis of a speed of a vehicle and a braking distance that is a distance to the stop position based on a detection result of a sensor, and a feedback braking force deriving unit that derives an estimated braking distance on the basis of the speed of the vehicle and derives a feedback braking force for reducing a deviation between the derived estimated braking distance and the braking distance, and that performs control to stop the vehicle at the stop position on the basis of the reference feedforward braking force and the feedback braking force".

Further, Patent Literature 1 describes that "the detected braking distance includes a fluctuation component that vibrates due to pitching by braking of the vehicle, but a braking distance estimation unit can smoothly correct this fluctuation component by the action of an adaptive filter coefficient or an adaptive filter coefficient correction amount. This allows an automatic stop control unit to perform smooth automatic brake control".

Incidentally, in order to achieve a smooth braking feeling for an occupant (including driver) of the vehicle when the vehicle is automatically stopped, jerk needs to be considered in vehicle deceleration in addition to curbing the fluctuation component vibrating due to pitching by braking. Here, "jerk" is a change rate of acceleration (deceleration) per unit time.

CITATIONS LIST

Patent Literature

Patent Literature 1: JP 2018-203015 A

SUMMARY

Technical Problems

An object of the present disclosure is to provide a brake control apparatus that automatically stops a vehicle, the brake control apparatus capable of smoothly stopping a vehicle in consideration of jerk without increasing the stop distance.

Solutions to Problems

A brake control apparatus of a vehicle receives a requested deceleration (Gr) and a requested stop distance (Dr) for each calculation period from a driving assistance device (SJ), and automatically applies a braking torque (Tq) to a wheel (WH) of the vehicle on the basis of the requested deceleration (Gr) and the requested stop distance (Dr). A brake control apparatus of a vehicle includes: a deceleration obtainment unit (GA) that acquires a deceleration (Ga) of the vehicle for each calculation period; a vehicle body speed calculation unit (VX) that calculates a vehicle body speed (Vx) of the vehicle for each calculation period; a storage unit (PF) that has a standard deceleration profile (Pgu) in which a standard deceleration (Gu) decreases with an "upwardly curving" characteristic and then decreases with a "downwardly curving" characteristic along with the lapse of time (T), and a standard speed profile (Pvu) corresponding to the standard deceleration profile (Pgu); a setting unit (ST) that sets a target deceleration profile (Pgt) and a target speed profile (Pvt) by adjusting the standard deceleration profile (Pgu) and the standard speed profile (Pvu) so as to satisfy a relationship between a reference deceleration (go) which is the deceleration (Ga) in a current calculation period (to) and a reference vehicle body speed (vo) which is the vehicle body speed (Vx) in the current calculation period (to), and; a distance calculation unit (DT) that calculates, based on the target speed profile (Pvt), an estimated stop distance (Dt) which is a distance required for the vehicle traveling at the reference vehicle body speed (vo) to stop; and an adjustment unit (TQ) that adjusts the braking torque (Tq) on the basis of the requested deceleration (Gr) in a state where a condition that the estimated stop distance (Dt) is equal to or less than the requested stop distance (Dr) is continuously denied, and adjusts the braking torque (Tq) on the basis of a target deceleration (Gt) determined according to the target deceleration profile (Pgt) after a calculation period in which the condition that the estimated stop distance (Dt) is equal to or less than the requested stop distance (Dr) is first satisfied.

According to the above configuration, since the target deceleration Gt is first adopted when the condition that the estimated stop distance Dt is equal to or less than the requested stop distance Dr is satisfied, an increase in the stop distance of the vehicle is avoided. Then, the braking torque Tq is determined by the target deceleration Gt based on the time-series profile Pgt that decreases with the "upwardly curving" characteristic and then decreases with the "downwardly curving" characteristic. For this reason, a favorable braking feeling for the occupant including the driver is achieved, and the vehicle is stopped smoothly.

DESCRIPTION OF EMBODIMENT

<Embodiment of Brake Control Apparatus of Vehicle>

Figure 1:
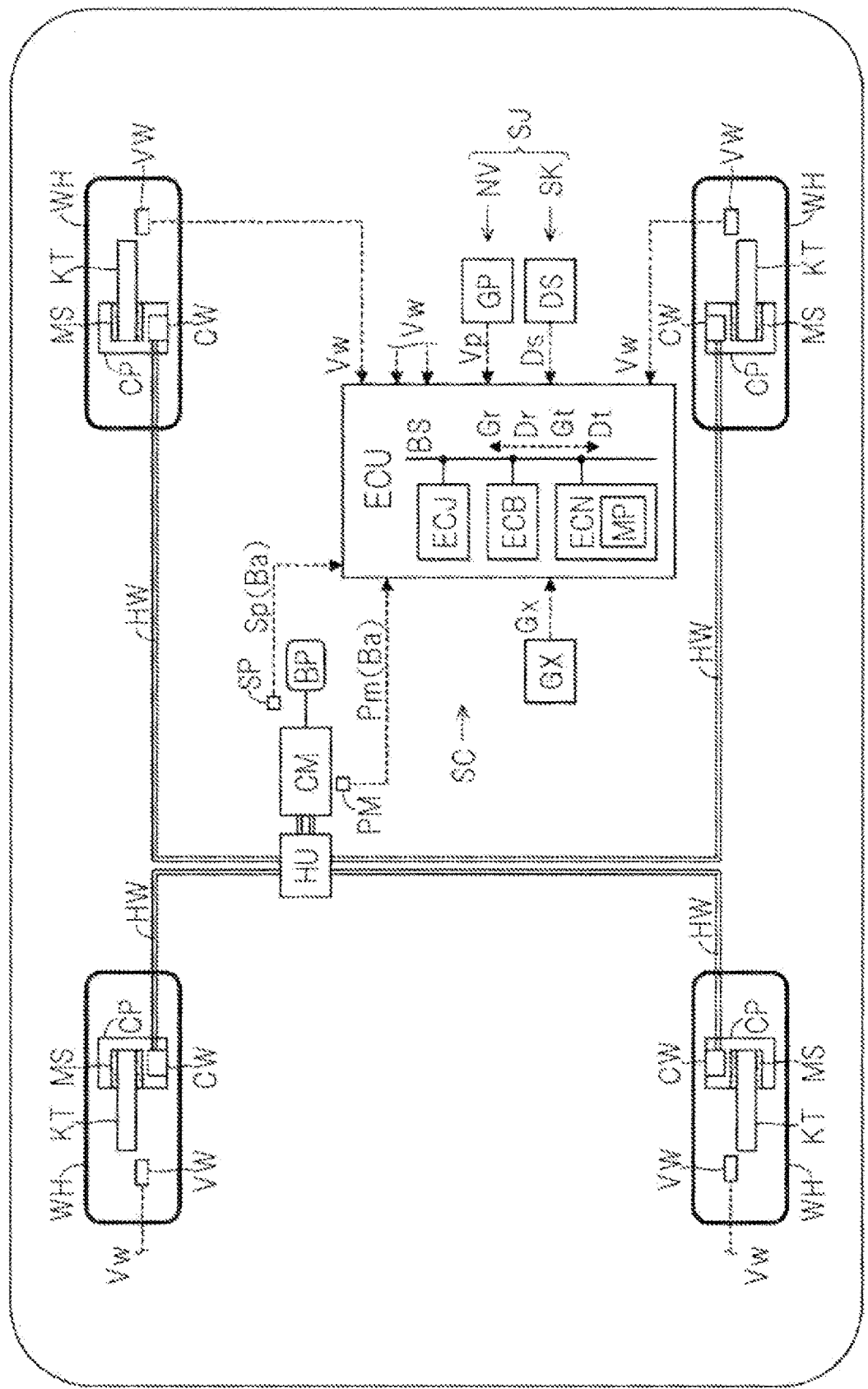
FIG. 1 is an overall configuration diagram for describing an embodiment of a brake control apparatus SC of a vehicle.

An embodiment of a brake control apparatus SC of a vehicle will be described with reference to an overall configuration diagram of FIG. 1. Note that in the following description, constituent members, calculation processes, signals, characteristics, and values denoted by the same reference signs, such as "WH", have the same functions.

A vehicle includes a braking operation member BP, an operation amount sensor BA, a wheel speed sensor VW, a deceleration sensor GX, a brake caliper CP, a wheel cylinder CW, a rotating member KT, a friction material MS, a perimeter monitoring device SK, a navigation device NV, and a brake control apparatus SC.

The braking operation member (e.g., brake pedal) BP is a member operated by the driver to decelerate the vehicle. When the braking operation member BP is operated, a braking torque Tq on a wheel WH is adjusted, and the braking force is generated in the wheel WH.

The braking operation amount sensor BA is provided to detect an operation amount Ba of the braking operation member (brake pedal) BP by the driver. Specifically, as the braking operation amount sensor BA, at least one of a master cylinder fluid pressure sensor PM that detects a fluid pressure (master cylinder fluid pressure) Pm in a master cylinder CM, an operation displacement sensor SP that detects an operation displacement Sp of the braking operation member BP, and an operation force sensor FP (not illustrated) that detects an operation force Fp of the braking operation member BP is adopted.

The wheel WH includes the wheel speed sensor VW that detects a wheel speed Vw, which is a rotation speed of the wheel WH. A vehicle body of the vehicle is provided with the deceleration sensor GX that detects an acceleration (deceleration) Gx in the longitudinal direction of the vehicle.

Each wheel WH of the vehicle includes the brake caliper CP, the wheel cylinder CW, the rotating member KT, and the friction material MS. Specifically, the rotating member (brake disc) KT is fixed to the wheel WH, and the brake caliper CP is disposed on the wheel WH. The brake caliper CP is provided with the wheel cylinder CW. The braking torque Tq is applied to the wheel WH by adjusting the fluid pressure (brake fluid pressure) Pw in the wheel cylinder CW. As a result, a braking force is generated in the wheel WH.

<<Driving Assistance Device SJ>>

In a driving assistance device SJ, a requested deceleration Gr and a requested stop distance Dr are calculated on the basis of the detection results of the various sensors. The requested deceleration Gr is a target value of deceleration for smoothly decelerating the vehicle on behalf of the driver at the current time point (corresponding calculation period). Additionally, the requested stop distance Dr is a distance from the vehicle to before a target object when the vehicle is decelerated at the requested deceleration Gr at the current time point (corresponding calculation period). For example, the driving assistance device SJ includes at least one of the perimeter monitoring device SK and the navigation device NV.

(1) Perimeter Monitoring Device SK

The vehicle is provided with the perimeter monitoring device SK (part of driving assistance device SJ). The perimeter monitoring device SK performs automatic braking control so that the vehicle does not collide with an obstacle. Further, in the perimeter monitoring device SK, automatic traveling control (=automatic braking control+automatic steering control) is performed on behalf of the driver of the vehicle. The perimeter monitoring device SK includes a distance sensor DS and a perimeter monitoring controller ECJ (part of controller ECU). The distance sensor DS detects a distance (relative distance) Ds between the vehicle and an object (other vehicle, fixed object, bicycle, person, animal, or the like) existing around the vehicle. For example, a camera (monocular, compound eye), a radar (millimeter wave, laser), an ultrasonic sensor, or the like is used as the distance sensor DS.

The detected relative distance (e.g., inter-vehicle distance to another vehicle ahead of the vehicle) Ds is input to the perimeter monitoring controller ECJ. In the controller ECJ, the requested deceleration Gr is calculated on the basis of the relative distance Ds. Additionally, when the vehicle is decelerated to a stop (e.g., when another vehicle existing ahead is stopped), a requested stop distance Dr is calculated. The requested deceleration Gr is transmitted to a braking controller ECB through a communication bus BS.

When a camera is employed as the distance sensor DS, a red light, a temporary stop line, a stopped vehicle ahead, and the like are detected by the camera. Then, the requested deceleration Gr and the requested stop distance Dr are calculated on the basis of the detected video signal.

(2) Navigation Device NV

The vehicle includes the navigation device NV (part of driving assistance device SJ). The navigation device NV has a function of electronically grasping the current position of the vehicle and performing route guidance to a destination on the basis of the vehicle position. The navigation device NV includes a global positioning system GP and a navigation controller ECN.

The global positioning system GP (GPS) is a satellite positioning system (system for measuring current position on the earth) that receives signals of a plurality of GPS satellites to detect a current position Vp of the vehicle. The global positioning system GP inputs the vehicle position Vp to the navigation controller ECN.

The navigation controller ECN is an electronic control unit for a navigation device. The navigation controller ECN includes map data (map information) MP having detailed road information. Specifically, the map information MP stores road shapes (curve radius including straight line, upward gradient and downward gradient of road, and the like). Additionally, the map information MP stores information on a signal, a temporary stop line, a railroad crossing, a sign, and the like. These pieces of road information are updated to the latest information as needed by communication with a base station, and signal information (red light), railroad crossing information, traffic congestion (in particular, vehicle position at end of line), and the like are transmitted from the base station.

In the navigation controller ECN, the vehicle position Vp is associated with at least one of the map information MP and the information from the base station, and a point (stopping point) where the vehicle should stop is determined. Then, in the navigation controller ECN, the requested deceleration Gr and the requested stop distance Dr are determined on the basis of the stopping point.

<<Brake Control Apparatus SC>>

The brake control apparatus SC includes the master cylinder CM, a fluid unit HU, and the braking controller ECB (part of controller ECU). The fluid unit HU is controlled by the braking controller ECB. The braking torque Tq is independently and individually adjusted by the fluid unit HU. The master cylinder CM, the fluid unit HU, and the wheel cylinder CW are connected through a fluid path HW. A brake fluid BF is moved from the master cylinder CM and the fluid unit HU to the wheel cylinder CW, whereby the braking torque Tq of each wheel WH is adjusted. For example, as the fluid unit HU, a configuration described in JP 2002-356152 A and the like can be adopted.

At the time of normal braking by the driver, the fluid unit HU is not operated, and the brake fluid BF is pumped from the master cylinder CM to the wheel cylinder CW in accordance with the operation of the braking operation member BP. The same fluid pressure (brake fluid pressure) Pw is applied to all the wheel cylinders CW.

The fluid unit HU (actuator) is operated when anti-lock control, traction control, vehicle stability control, automatic braking control, stoppage maintenance control, and the like are performed. The brake fluid pressure Pw is adjusted independently of the operation of the braking operation member BP and individually for each wheel by the operation of the fluid unit HU. As a result, the braking torque (as a result, braking force) of each wheel WH can be independently and individually controlled. The fluid unit HU includes an electric pump and a plurality of electromagnetic valves. The fluid unit HU (in particular, electric motor of electric pump and electromagnetic valve) is controlled by the braking controller ECB.

Information (calculated value, sensor value, and the like) is shared among the braking controller ECB, the perimeter monitoring controller ECJ, and the navigation controller ECN through the communication bus BS. The requested deceleration Gr and the requested stop distance Dr calculated by the perimeter monitoring controller ECJ and/or the navigation controller ECN are input to the braking controller ECB through the communication bus BS. In the braking controller ECB, stop control for automatically stopping the vehicle is performed on the basis of the requested deceleration Gr and the requested stop distance Dr.

Note that since signals (detected value, calculated value) are shared through the communication bus BS, various calculations can be processed by any controller. The controllers ECB, ECJ, and ECN connected to the network through the communication bus BS are collectively referred to as "ECU (electronic control unit)". That is, the controller ECU includes the braking controller ECB, the perimeter monitoring controller ECJ, and the navigation controller ECN. These controllers may be integrated into one controller ECU.

In the brake control apparatus SC described above, a hydraulic type using a working liquid (brake liquid) has been exemplified. Alternatively, an electric brake control apparatus SC that does not use a brake fluid can be adopted. In the apparatus, rotation of an electric motor is converted into linear power by a screw mechanism or the like, and a friction member is pressed against a rotating member KT. In this configuration, the pressing force of the friction member against the rotating member KT is generated using the electric motor as a power source instead of the brake fluid pressure Pw. That is, the braking torque Tq is applied by the electric motor, and the braking force is generated in the wheel WH (see JP 2008-184023 A, for example).

<Calculation Processing of Smooth Stop Control>

Figure 2:
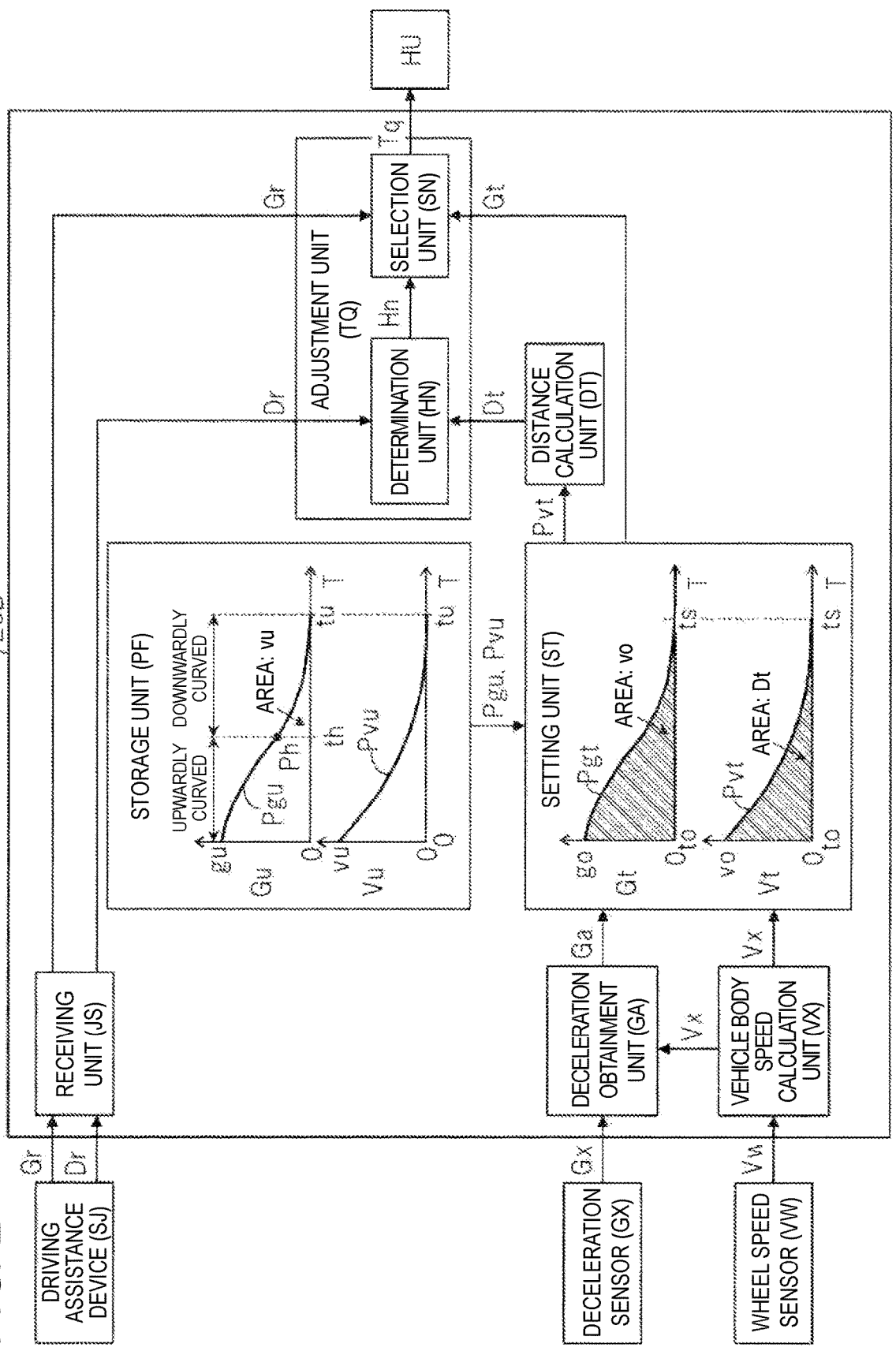
FIG. 2 is a functional block diagram for describing processing of smooth stop control.

Processing of smooth stop control will be described with reference to a functional block diagram of FIG. 2. "Smooth stop control" is automatic braking control that can give a smooth braking feeling to an occupant of the vehicle in consideration of jerk (change rate of deceleration) of the vehicle. For example, an algorithm of smooth stop control is programmed in the braking controller ECB.

Smooth stop control includes a reception unit JS, a vehicle body speed calculation unit VX, a deceleration obtainment unit GA, a storage unit ST, a setting unit ST, a distance calculation unit DT, and an adjustment unit TQ.

The requested deceleration Gr and the requested stop distance Dr calculated by the driving assistance device SJ are transmitted to the communication bus BS. The reception unit JS receives the requested deceleration Gr and the requested stop distance Dr for each calculation period. For example, the requested deceleration Gr is determined as a constant value of "0.3G" or less corresponding to normal braking of the driver. Additionally, the requested stop distance Dr is determined as a distance by which the vehicle can be stopped with a margin to a target point (rear end portion of another vehicle ahead of vehicle, stop line, railroad crossing, obstacle, and the like) when the vehicle is decelerated at the requested deceleration Gr.

The vehicle body speed calculation unit VX calculates a vehicle body speed Vx for each calculation period on the basis of the wheel speed Vw. For example, during non-braking including acceleration of the vehicle, the vehicle body speed Vx is calculated on the basis of the slowest (slowest wheel speed) of the four wheel speeds Vw. At the time of braking, the vehicle body speed Vx is calculated on the basis of the fastest (fastest wheel speed) of the four wheel speeds Vw. Further, in the calculation of the vehicle body speed Vx, a limitation may be provided in the temporal change amount. That is, an upper limit value αup of the increase gradient of the vehicle body speed Vx and a lower limit value αdn of the decrease gradient are set, and the change in the vehicle body speed Vx is limited by the upper and lower limit values αup and αdn.

The deceleration obtainment unit GA acquires the deceleration Gx detected by the deceleration sensor GX as an actual value Ga of deceleration. The deceleration Ga is the actually generated deceleration (negative acceleration) in the longitudinal direction (traveling direction) of the vehicle. Additionally, the deceleration Ga (actual value) can be determined on the basis of the vehicle body speed Vx. Specifically, the vehicle body speed Vx is time-differentiated to calculate the actual deceleration Ga. Further, in order to improve the robustness, the actual vehicle deceleration Ga may be calculated on the basis of the differential value (calculated value) of the vehicle body speed Vx and the actual deceleration Gx (detected value). Note that the deceleration Ga is also calculated for each calculation period.

The storage unit ST stores a standard deceleration profile Pgu in the relationship between time T and a standard deceleration Gu. A "profile" represents the change in a state variable in time series. The standard deceleration profile Pgu is a preset time-series characteristic of deceleration that provides a sense of security to the occupant and serves as a standard for smoothly stopping the vehicle in consideration of jerk (change rate) of the vehicle body deceleration. In the standard deceleration profile Pgu, the calculation period in which the standard deceleration profile Pgu is applied is set to "0 (reference time)", and the standard deceleration Gu is decreased from a predetermined standard deceleration gu with an "upwardly curving" along with the lapse of time T. Then, when time T reaches a time point th, the standard deceleration Gu is decreased with a "downwardly curving" characteristic and at a time point (end point) tu, the standard deceleration Gu is set to "0". Accordingly, the standard deceleration profile Pgu has a point Ph of inflection changing from the "upward curve" to the "downward curve". The "inflection point" is a point at which the sign (plus or minus) of the curvature changes, and is a point at which the second derivative is "0". Here, the values gu, th, and to are predetermined values (constants) set in advance.

The "upwardly curving" characteristic is such a characteristic that a line segment connecting two points on a curve is always on the lower side of the curve (e.g., a function). On the other hand, the "downwardly curving" characteristic is such a characteristic that a line segment connecting two points on a curve is always on the upper side of the curve (e.g., a function). Since the standard deceleration profile Pgu is set to transition from the "upwardly curving" characteristic to the "downwardly curving" characteristic in the time series characteristic, the vehicle can be decelerated very smoothly. The standard deceleration profile Pgu may be defined as a collection of data points with respect to time T. Additionally, the standard deceleration profile Pgu may be set as a function with respect to time T. The time-series characteristic Pgu gives a sensuous peace of mind to the occupant of the vehicle.

The storage unit ST stores a standard speed profile Pvu defined in the relationship between time T and a standard speed Vu. The standard speed profile Pvu is a time-series characteristic of the vehicle body speed preset to correspond to the standard deceleration profile Pgu. When time T is the reference time (T=0), the standard speed profile Pvu is a predetermined speed vu (also referred to as "predetermined standard speed"), and smoothly decreases with the "downwardly curving" characteristic according to the lapse of time T, and is set to "0" at a time point tu. The time point tu (corresponding calculation period) is called a "standard end point (also referred to as "standard end calculation period"). That is, in the standard deceleration profile Pgu and the standard speed profile Pvu, the standard deceleration Gu and the standard vehicle body speed Vu are set to "0" at the same time (standard end point tu). Similarly to the standard deceleration profile Pgu, the standard speed profile Pvu is set as a set of data points or a function with respect to time T.

There is a predetermined relationship (i.e., relationship between speed and acceleration) between the standard deceleration profile Pgu and the standard speed profile Pvu. A characteristic obtained by time-differentiating the standard speed profile Pvu from "T=0" coincides with the standard deceleration profile Pgu. Additionally, a value obtained by time-integrating the standard deceleration profile Pgu from "T=0" to "T=tu" coincides with the predetermined standard speed vu. That is, the area of a portion surrounded by the vertical axis (acceleration axis), the horizontal axis (time axis), and the standard deceleration profile Pgu is the predetermined standard speed vu.

The setting unit ST calculates a target deceleration profile Pgt and a target speed profile Pvt on the basis of the deceleration Ga, the vehicle body speed Vx, the standard deceleration profile Pgu, and the standard speed profile Pvu. The target deceleration profile Pgt and the target speed profile Pvt are time-series characteristics (target profiles) for pre-reading and estimating a future state quantity on the basis of an actual state quantity (Ga, Vx, and the like) in the current calculation period (current time point) to. The setting unit ST sets the actual deceleration Ga in the current calculation period (current time point) to as a reference deceleration go. Additionally, the vehicle body speed Vx in the current calculation period to is set as a reference vehicle body speed vo. Then, the target deceleration profile Pgt and the target speed profile Pvt are set by adjusting the standard deceleration profile Pgu and the standard speed profile Pvu so as to satisfy the relationship between the reference deceleration go and the reference vehicle body speed vo.

In the deceleration profiles Pgu and Pgt, the "upwardly curving" characteristic and the "downwardly curving" characteristic are connected at an inflection point (e.g., point Ph). Instead of such characteristics, the deceleration profiles Pgu and Pgt may be determined as characteristics in which an inflection point of an "upwardly curving" characteristic and an inflection point of a "downwardly curving" characteristic are connected by a straight line (i.e., characteristic in which two inflection points are connected by straight line).

<<Setting of Target Deceleration Profile Pgt>>

The standard deceleration profile Pgu is adjusted (deformed) by the following method to set the target deceleration profile Pgt.
(1) The reference time point "0" of the standard deceleration profile Pgu is set to the current calculation period (current time point) to in the target deceleration profile Pgt.
(2) The intercept (point intersecting vertical axis) gu of the standard deceleration profile Pgu is adjusted to the reference deceleration (actual deceleration at current time point) go and is taken as the intercept of the target deceleration profile Pgt. That is, the standard deceleration profile Pgu is adjusted (enlarged or reduced) in the direction of the vertical axis (deceleration) such that the predetermined standard deceleration gu coincides with the reference deceleration go, and the target deceleration profile Pgt is determined.
(3) In the target deceleration profile Pgt adjusted in the processing (2), an end point ts is adjusted such that the time integral value of the target deceleration profile Pgt coincides with the reference vehicle body speed (actual vehicle body speed at current time point) vo, and the final target deceleration profile Pgt is determined. Here, the time point ts where "Gt=0" is also called an "end calculation period". That is, the target deceleration profile Pgt is set such that the area of a portion surrounded by the horizontal axis (time T=to to ts), the vertical axis (Gt=0 to go), and the target characteristic Pgt becomes the reference vehicle body speed vo.

The target deceleration profile Pgt is adjusted (corrected) and set in both the target deceleration Gt (vertical axis) and the time T (horizontal axis) on the basis of the standard deceleration profile Pgu. For this reason, the relationship between the reference state quantity go (deceleration) and vo (vehicle body speed) at the current time point to is satisfied, and the target deceleration Gt is set as a time-series characteristic decreased so as to transition from the reference deceleration go to "curve upward", pass through the inflection point, and "curve downward", and reach "0" at the end point (end calculation period) ts.

<<Setting of Target Speed Profile Pvt>>

The standard speed profile Pvu is adjusted (deformed) by the following method to set the target speed profile Pvt.
(1) The reference time point "0" of the target speed profile Pvt is set to the current calculation period (current time point) to in the target speed profile Pvt.
(2) The intercept (point intersecting vertical axis) vu of the standard speed profile Pvu is adjusted to the reference vehicle body speed (actual vehicle body speed at current time point) vo and is taken as the intercept of the target speed profile Pvt. That is, the standard speed profile Pvu is adjusted (enlarged or reduced) in the direction of the vertical axis (vehicle body speed) such that the predetermined standard speed vu coincides with the reference vehicle body speed vo, and the target speed profile Pvt is determined. Further, the standard speed profile Pvu is adjusted (corrected) in the direction of the horizontal axis (time axis) such that the end point (standard end calculation period) to of the standard speed profile Pvu coincides with the end point (end calculation period) ts in the target speed profile Pvt, and the final target speed profile Pvt is set.

The distance calculation unit DT calculates (estimates) an estimated stop distance Dt on the basis of the target speed profile Pvt. The estimated stop distance Dt is an estimated value of the stop distance (also referred to as "estimated stop distance Dt") when the vehicle is decelerated from the reference deceleration go at the current time point to according to the target deceleration profile Pgt and comes to a stop. In other words, the estimated stop distance Dt is a distance required for the vehicle traveling at the reference vehicle body speed vo to stop (i.e., when "Vx=0"), according to the target speed profile Pvt. Specifically, the estimated stop distance Dt is determined by time-integrating the target speed profile Pvt from the current time point to to the end point ts, that is, the area of a portion surrounded by the time axis (T=to to ts) which is the horizontal axis, the speed axis (Vt=0 to vo) which is the vertical axis, and the target characteristic Pvt is calculated as the estimated stop distance Dt.

The adjustment unit TQ calculates a target value of the braking torque Tq on the basis of the requested stop distance Dr, the estimated stop distance Dt, the requested deceleration Gr, and the target deceleration Gt. The adjustment unit TQ includes a determination unit HN and a selection unit SN.

The determination unit HN compares the requested stop distance Dr received by the reception unit JS with the estimated stop distance Dt calculated by the distance calculation unit DT, and outputs a determination result Hn. The determination result Hn is a result of determining the magnitude relationship between the requested stop distance Dr and the estimated stop distance Dt, and is output as a determination flag (value of "0" or "1"). If the requested stop distance Dr is shorter (smaller) than the estimated stop distance Dt (i.e., "Dt>Dr"), the determination flag Hn is set to "0". However, if a condition that the estimated stop distance Dt is equal to or less than the requested stop distance Dr (i.e., "Dt Dr") is satisfied, the determination flag Hn is switched from "0" to "1".

The selection unit SN, selects, based on the determination flag Hn, any one of the requested deceleration Gr received by the reception unit JS and the target deceleration Gt calculated on the basis of the target deceleration profile Pgt by the setting unit ST. During a series of automatic braking, when a condition that "the estimated stop distance Dt is equal to or less than the requested stop distance Dr" is continuously denied and "Hn=0" is continued, the braking torque Tq (target value) is determined on the basis of the requested deceleration Gr. Specifically, the requested deceleration Gr is multiplied by a predetermined coefficient based on the vehicle mass and the specifications (effective radius of rotating member KT, friction coefficient of friction member MS, pressure receiving area of wheel cylinder CW, and the like) of the braking device, and the requested deceleration Gr is converted into the braking torque Tq. Here, "during a series of automatic braking" means a period from when the automatic braking is started until the vehicle is stopped.

On the other hand, during the series of automatic braking, from a calculation period (time point) in which the condition that "the estimated stop distance Dt is equal to or less than the requested stop distance Dr" is satisfied for the first time, the target deceleration Gt is adopted instead of the requested deceleration Gr. Then, a target value of the braking torque Tq is calculated on the basis of the target deceleration Gt. Specifically, the target deceleration Gt is multiplied by the predetermined coefficient to determine the target value of the braking torque Tq. After the calculation period in which the determination flag Hn is switched from "0 (indicating "Dt>Dr")" to "1 (indicating "Dt≤Dr")", the braking torque Tq (target value) is calculated according to the target deceleration profile Pgt.

The fluid unit HU controls the actual braking torque Tq on the basis of the target value of the braking torque Tq, so that the actual braking torque Tq coincides with the target value. For example, when the braking torque Tq is controlled by the fluid pressure (brake fluid pressure) Pw of the wheel cylinder CW, a target value Pt of the braking fluid pressure is calculated according to the target value of the braking torque Tq. Then, fluid pressure feedback control is performed on the basis of the fluid pressure target value Pt and the brake fluid pressure Pw (actual value) detected by the fluid pressure sensor or the estimated value according to the driving state of an electromagnetic valve or the like. Additionally, in the deceleration of the vehicle, deceleration feedback control can be performed on the basis of the target values Gr and Gt and the actual value Ga. Further, vehicle body speed feedback control may be performed on the vehicle body speeds Vt (target value) and Vx (actual value).

As described above, in the brake control apparatus SC, while the condition that "the estimated stop distance Dt is equal to or less than the requested stop distance Dr" is continuously denied during automatic braking control from the start of deceleration to the vehicle stop, the braking torque Tq is calculated on the basis of the requested deceleration Gr. That is, in the state of "Dt>Dr", the target deceleration profile Pgt is not applied so that the stop distance does not increase. However, once the condition that "the estimated stop distance Dt is equal to or less than the requested stop distance Dr" is satisfied during the automatic braking control, the target deceleration profile Pgt is applied after the calculation period, and the braking torque Tq is determined on the basis of the target deceleration Gt. The target deceleration Gt of smooth stop control is determined on the basis of a profile (time-series characteristic) Pgt in which the target deceleration Gt decreases with an "upwardly curving" characteristic, passes through an inflection point (or straight line connecting two inflection points), and decreases with a "downwardly curving" characteristic along with the lapse of time T. In smooth stop control, the target deceleration Gt is first adopted when "Dt Dr" is satisfied, and therefore an increase in the stop distance is avoided. Further, since the target deceleration Gt is determined on the basis of the target deceleration profile Pgt in consideration of the rate of change in deceleration (jerk), a favorable braking feeling for the occupant is achieved, and the vehicle is smoothly decelerated and stopped.

Note that the smooth stop control based on the target deceleration profile Pgt is for stopping the vehicle in a favorable manner. Accordingly, when the vehicle body speed Vx is equal to or higher than a predetermined speed vx, the target deceleration profile Pgt is not set, and in the automatic braking control, the braking torque Tq is always calculated on the basis of the requested deceleration Gr. That is, when "Vx≥vx", execution of the smooth stop control based on the target deceleration profile Pgt is prohibited. In other words, execution of the smooth stop control based on the target deceleration profile Pgt is permitted only when the vehicle body speed Vx is less than the predetermined speed vx. Here, the predetermined speed vx (also referred to as "predetermined permitted speed") is a predetermined value (constant) set in advance.

The invention claimed is:

1. A brake control apparatus of a vehicle that receives a requested deceleration and a requested stop distance from a driving assistance device for each calculation period, and automatically applies a braking torque to a wheel of the vehicle based on the requested deceleration and the requested stop distance, the brake control apparatus comprising:
   a deceleration obtainment unit that acquires a deceleration of the vehicle for each calculation period;
   a vehicle body speed calculation unit that calculates a vehicle body speed of the vehicle for each calculation period;
   a storage unit that has 1) a standard deceleration profile corresponding to a graph of standard deceleration versus time in which the standard deceleration decreases over a first period of time according to a curve having a downwardly-facing concavity and decreases over a second period of time after the first period of time according to a curve having an upwardly-facing concavity, the curve having the downwardly-facing concavity being connected to the curve having the upwardly-facing concavity at an inflection point, and 2) a standard speed profile corresponding to the standard deceleration profile;

a setting unit that sets a target deceleration profile and a target speed profile by adjusting the standard deceleration profile and the standard speed profile so as to satisfy a relationship between a reference deceleration which is the deceleration in a current calculation period and a reference vehicle body speed which is the vehicle body speed in the current calculation period, and;

a distance calculation unit that calculates, based on the target speed profile, an estimated stop distance which is a distance required for the vehicle traveling at the reference vehicle body speed to stop; and an adjustment unit that adjusts the braking torque based on the requested deceleration in a state where a condition that the estimated stop distance is equal to or less than the requested stop distance is continuously denied, and adjusts the braking torque based on a target deceleration determined according to the target deceleration profile after a calculation period in which the condition that the estimated stop distance is equal to or less than the requested stop distance is first satisfied, wherein execution of stop control based on the target deceleration profile is prohibited when the vehicle body speed is equal to or higher than a predetermined speed and the execution of stop control based on the target deceleration profile is permitted only when the vehicle body speed is less than the predetermined speed.

* * * * *